(12) United States Patent
Sun

(10) Patent No.: US 9,057,509 B2
(45) Date of Patent: Jun. 16, 2015

(54) BACKLIGHT MODULE AND BACKLIGHT LAMP GUIDE THEREOF

(71) Applicants: BOE TECHNOLOGY GROUP CO., LTD., Beijing (CN); HEFEI BOE DISPLAY LIGHT CO., LTD., Hefei, Anhui (CN)

(72) Inventor: Wenbo Sun, Beijing (CN)

(73) Assignees: BOE TECHNOLOGY GROUP CO., LTD., Beijing (CN); HEFEI BOE DISPLAY LIGHT CO., LTD., Hefei, Anhui (CN)

( * ) Notice: Subject to any disclaimer, the term of this patent is extended or adjusted under 35 U.S.C. 154(b) by 0 days.

(21) Appl. No.: 13/983,918

(22) PCT Filed: Mar. 6, 2013

(86) PCT No.: PCT/CN2013/072257
§ 371 (c)(1),
(2) Date: Aug. 6, 2013

(87) PCT Pub. No.: WO2013/174168
PCT Pub. Date: Nov. 28, 2013

(65) Prior Publication Data
US 2014/0063786 A1    Mar. 6, 2014

(30) Foreign Application Priority Data
May 23, 2012 (CN) .................... 2012 2 0235278 U

(51) Int. Cl.
*G09F 13/04* (2006.01)
*F21V 21/088* (2006.01)
(Continued)

(52) U.S. Cl.
CPC ......... *F21V 21/088* (2013.01); *G02F 1/133604* (2013.01); *G02F 1/133608* (2013.01); *G02F 2201/465* (2013.01); *G09F 13/04* (2013.01); *F16B 21/086* (2013.01); *F16B 21/088* (2013.01)

(58) Field of Classification Search
CPC .......................... G02F 1/133608; F21V 21/088
USPC .................................................. 362/97.1–97.4
See application file for complete search history.

(56) References Cited

U.S. PATENT DOCUMENTS 8,376,605 B2 * 2/2013 Azuma et al. ................. 362/634
8,430,520 B2 * 4/2013 Takeba ......................... 362/97.2
(Continued)

FOREIGN PATENT DOCUMENTS

CN       1567059 A     1/2005
CN     101036023 A     9/2007
(Continued)

OTHER PUBLICATIONS

International Search Report dated Jun. 13, 2013; Appln. No. PCT/CN2013/072257.
(Continued)

*Primary Examiner* — Jong-Suk (James) Lee
*Assistant Examiner* — Christopher E Dunay
(74) *Attorney, Agent, or Firm* — Ladas & Parry LLP

(57) ABSTRACT

A backlight module and a backlight lamp guide for the backlight module. The backlight lamp guide (5) comprises: a fixed base (3); a lamp clamping portion (2) provided on a first side of the fixed base (3); and a snap-fit structure (4) provided on a second side of the fixed base (3) opposite to the first side, wherein the snap-fit structure (4) comprises a snap-fit resilient structure (44); when the snap-fit structure (4) and a back cover (7) are snap-fitted, the snap-fit resilient structure (44) is elastically deformed, to exert an elastic retaining force on the back cover (7) in a direction away from the fixed base (3). The snap-fit resilient structure (44) facilitates a sufficient snap-fit of the snap-fit structure (4) with the back cover (7) of a backlight module.

20 Claims, 4 Drawing Sheets

(51) Int. Cl.
*G02F 1/1335* (2006.01)
*F16B 21/08* (2006.01)

(56) References Cited

U.S. PATENT DOCUMENTS

| | | | | |
|---|---|---|---|---|
| 8,585,229 | B2 * | 11/2013 | Lai et al. | 362/97.4 |
| 2007/0070652 | A1 | 3/2007 | Takata et al. | |
| 2008/0019152 | A1 * | 1/2008 | Aoki et al. | 362/634 |
| 2009/0080179 | A1 * | 3/2009 | Takata | 362/97.1 |
| 2013/0070166 | A1 * | 3/2013 | Kuroda | 348/739 |
| 2014/0063786 | A1 | 3/2014 | Sun | |

FOREIGN PATENT DOCUMENTS

| | | |
|---|---|---|
| CN | 101598868 A | 12/2009 |
| CN | 201827834 U | 5/2011 |
| CN | 202631895 U | 12/2012 |
| EP | 2351964 A1 * | 8/2011 |
| JP | 2009295452 A | 12/2009 |
| KR | 1020050036525 A | 4/2005 |
| WO | 2008103035 A1 | 9/2008 |

OTHER PUBLICATIONS

International Preliminary Report on Patentability Appln. No. PCT/CN2013/072257; Dated Nov. 25, 2014.

Korean Examination Opinion Appln. No. 10-2013-7019863; Issued Jul. 9, 2014.

* cited by examiner

BACKLIGHT MODULE AND BACKLIGHT LAMP GUIDE THEREOF

FIELD OF THE INVENTION

The present invention relates to a backlight module and a backlight lamp guide thereof.

BACKGROUND OF THE INVENTION

In a liquid crystal display device, due to the fact that the liquid crystal of a liquid crystal display panel itself has no function of light-emitting, it is necessary to provide a light source, such as backlight module, for the liquid crystal display panel to realize a display function. A backlight module can be divided into: an edge-lit backlight module and a direct-lit backlight module.

With continuing extension of the application fields of liquid crystal display devices, especially the applications of large-sized liquid crystal display devices, further requirements are put forward about the light-emitting brightness of a backlight module of a liquid crystal display device; for this reason, it is necessary to use a plurality of light-emitting elements to increase the light-emitting brightness of a backlight module, and a direct-lit backlight module meets such a demand.

A direct-lit backlight module comprises: a back cover; a plurality of light-emitting elements arranged side by side; a backlight lamp guide, supported and fixed on the back cover for securely positioning the light-emitting elements; and a reflecting plate provided on the back cover and used for reflecting the light emitted from the light-emitting elements (also may be reflectors or films provided by coating or adhesion on one face of the back cover that contacts with the backlight lamp guide). The light-emitting elements are fixed by a lamp clamping portion 2 of the backlight lamp guide of the liquid crystal display device. As shown in FIG. 1, the backlight lamp guide of the liquid crystal display device is connected to the back cover (in a backlight source, there may be a plurality of sets of backlight lamp guides of a liquid crystal display device, although only one set is shown in the figure). The backlight lamp guide comprises: a fixed base 3', a lamp positioning structure, and a supporter 1' for supporting optical films such as a diffusion plate. The lamp positioning structure is provided on two sides of the fixed base 3'; the supporter 1' is provided at an intermediate portion on an upper surface of the fixed base 3'. The lamp positioning structure comprises: a lamp clamping portion 2' used for fixing a lamp (such as cold cathode fluorescent tube), and a snap-fit structure 4' used for fixing the backlight lamp guide of the liquid crystal display device on the back cover. The lamp clamping portion 2' and the snap-fit structure 4' are integrally molded; the bottoms of the supporter 1' and of the lamp clamping portion 2' are connected by the fixed base 3'. The snap-fit structure 4 passes through a hole on the back cover, the snap-hooks of the snap-fit structure 4 retracts while passing through the hole and expands after passing through the hole, thereby clamping the back cover between the lower surface of the lamp clamping portion 2 and the upper surface of the snap-fit structure 4, so as to position the backlight lamp guide with respect to the back cover.

SUMMARY OF THE INVENTION

The inventors have found that, in an existing snap-fit structure of a backlight lamp guide for a backlight module in a liquid crystal display device, in order to ensure full snap-fit and also to ensure high strength and no looseness after snap-fit, accuracy is especially required to an distance between the lower surface of the lamp clamping portion (the lower surface of the back cover after snap-fit) and the upper surface of the snap-fit structure. If there is a too large distance between the lower surface of the lamp clamping portion and the upper surface of the snap-fit structure, a loose snap-fit will be resulted. If there is a too small distance between the lower surface of the lamp clamping portion and the upper surface of the snap-fit structure, it will cause difficult snap-fit of the snap-fit structure, or the fins of the snap-fit structure can not be opened, thereby resulting in unstable snap-fit, and unstable snap-fit will lead to unstable positioning of the backlight source, which in turn affects the light-emitting uniformity of the backlight module.

According to an embodiment of the present invention, there is provided a backlight lamp guide for a backlight module, which comprises: a fixed base; a lamp clamping portion, provided on a first side of the fixed base; and a snap-fit structure, provided on a second side of the fixed base opposite to the first side, wherein, the snap-fit structure comprises a snap-fit resilient structure; when the snap-fit structure and a back cover are snap-fitted, the snap-fit resilient structure is elastically deformed, to exert an elastic retaining force on the back cover in a direction away from the fixed base.

In some embodiments, the snap-fit structure may further comprise: a snap-fit cylinder with one end thereof being connected to the fixed base; a snap-fit base provided at the other end of the snap-fit cylinder; and at least one fin extending from the snap-fit base along a direction away from the snap-fit cylinder and toward the fixed base.

Preferably, the snap-fit structure further comprises: a snap-fit protrusion provided on at least one lateral face of the snap-fit cylinder.

According to a preferred embodiment, the snap-fit resilient structure may be an oblique-L-shaped structure extending from the second side of the fixed base.

For example, one end of the oblique-L-shaped structure connecting with the fixed base may be located on a lateral face of one end of the snap-fit cylinder connecting with the fixed base, and, the other end of the oblique-L-shaped structure extends along a direction away from the fixed base and away from the snap-fit cylinder.

Preferably, the section of the fixed base where the snap-fit structure is provided is offset toward the first side, with respect to the section of the fixed base where the lamp clamping portion is provided.

The backlight lamp guide may further comprise: a supporter provided on the first side of the fixed base, and the supporter is provided in said section of the fixed base where the lamp clamping portion is provided.

Preferably, the backlight lamp guide has one said lamp clamping portion provided at each of the two sides of the supporter.

According to other preferred embodiments, the section of the fixed base where the snap-fit structure is provided may be offset toward the first side, with respect to the section of the fixed base where the lamp clamping portion is provided, and, the snap-fit resilient structure may be configured as an arcuate portion of the fixed base, which is connected between the section of the fixed base where the snap-fit structure is provided and section of the fixed base where the lamp clamping portion is provided.

The backlight lamp guide may further comprise: a supporter provided, corresponding to the snap-fit structure, on the first side of the fixed base.

Preferably, the backlight lamp guide has one said lamp clamping portion provided at each of the two sides of the supporter.

Additionally, preferably, the number of the snap-fit protrusions is two, which are located on two opposite lateral faces of the snap-fit cylinder.

The number of the fins of the snap-fit structure may be two, and preferably, the two fins are located respectively on two lateral faces of the snap-fit cylinder other than the lateral faces where the snap-fit protrusions are provided.

According to an embodiment of the present invention, there is further provided a backlight module, which comprises: a back cover; a lamp; and a backlight lamp guide, comprising: a fixed base; a lamp clamping portion, provided on a first side of the fixed base; and a snap-fit structure, provided on a second side of the fixed base opposite to the first side, for fixing to the back cover, wherein, the snap-fit structure of the backlight lamp guide comprises a snap-fit resilient structure; when the snap-fit structure and the back cover are snap-fitted, the snap-fit resilient structure is elastically deformed, to exert an elastic retaining force on the back cover in a direction away from the fixed base.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative to the invention.

Figure 1:
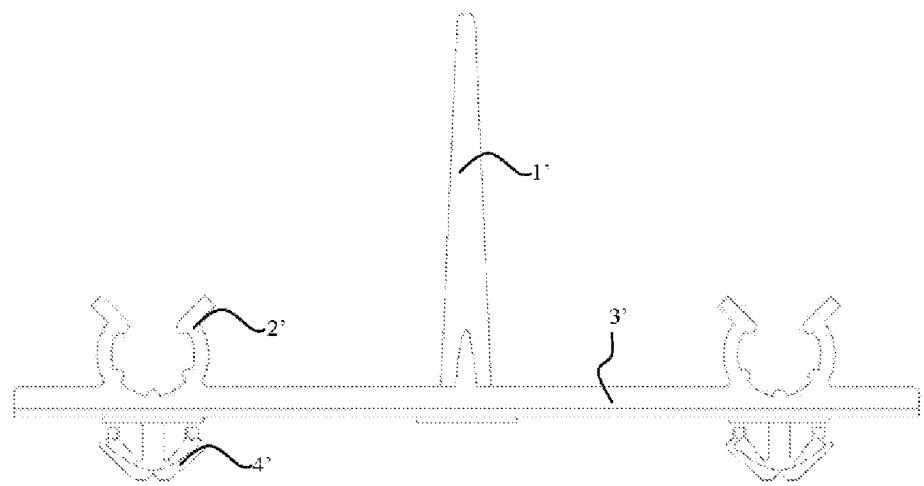
FIG. 1 is a front view of an existing backlight lamp guide.

REFERENCE NUMERALS 1, 1': supporter; 2, 2': lamp clamping portion; 3, 3': fixed base; 4, 4': snap-fit structure;

5: backlight lamp guide; 6: optical films; 7: back cover; 41: snap-fit cylinder; 42: snap-fit base; 43: fin; 44: oblique-L-shaped structure; 45: snap-fit protrusion; 35: arcuate structure.

DETAILED DESCRIPTION OF THE PREFERRED EMBODIMENTS

Below, in connection with the accompanying drawings in the embodiments of the present invention, the technical solutions in the embodiments of the present invention will be described in a clear and sufficient way. It is obvious that, the described embodiments are only a part but not all of the embodiments of the present invention. Based on the embodiments of the present invention, those skilled in the art can obtain other embodiment(s), without any inventive work, which should be within the scope of the invention. The following description of the embodiments is illustration with reference to the accompanying drawings, and used to explain that the present invention can be carried out. As used in the present invention, the terms "upper surface", "lower surface", "left lateral face", and the like, are merely made reference to the directions in the drawings. Accordingly, the directional terms as used are intended for explanation, but not for limiting the terms in the embodiments of the present invention.

An embodiment of the present invention provides a backlight lamp guide 5 of a liquid crystal display device, which is provided in a backlight module of the liquid crystal display device, and is used for clamping light-emitting elements, so as to fix the light-emitting elements to a back cover. It should be noted that, in the backlight module, there may comprise a plurality of sets of backlight lamp guides 5 of a liquid crystal display device, although only one set is shown in the figures of the embodiments of the present invention.

Figure 2:
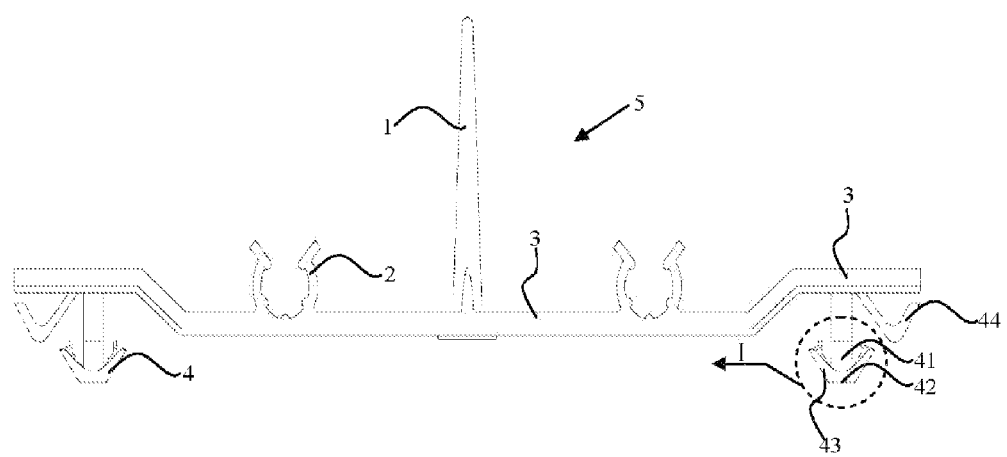
FIG. 2 is a front view of a backlight lamp guide according to an embodiment of the present invention.
Figure 3:
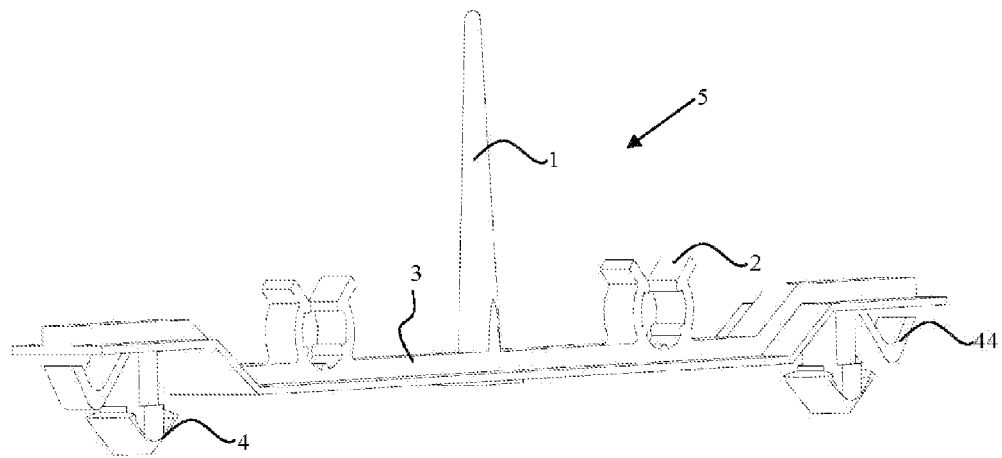
FIG. 3 is a perspective view of a backlight lamp guide according to an embodiment of the present invention.

FIG. 2 is a front view of a backlight lamp guide 5 for a backlight module, according to an embodiment of the present invention; FIG. 3 is a perspective view of the backlight lamp guide 5. The backlight lamp guide 5 of this embodiment comprises a fixed base 3 and a lamp clamping portion 2. The fixed base 3 has an upper surface and a lower surface (corresponding to the first side and the second side of the fixed base 3).

At the intermediate portion on the upper surface of the fixed base 3, there may be provided with a supporter 1; at each of the two sides of the supporter 1 on the upper surface of the fixed base 3, there may be provided with one lamp clamping portion 2.

The backlight lamp guide 5 further comprises a snap-fit structure 4, and the snap-fit structure 4 is located on the lower surface of the fixed base 3. The fixed base 3 may have one snap-fit structure 4 provided at each of its outermost sides.

In the example shown in the figure, the backlight lamp guide 5 comprises: one supporter 1, two lamp clamping portions 2 and two snap-fit structures 4; the lamp clamping portions 2 are located on the upper surface of the fixed base 3; the number of the snap-fit structures 4 is two, and the two snap-fit structures 4 are located on the lower surface of the fixed base 3. As shown in the figures, there are sequentially provided with the snap-fit structure 4, the lamp clamping portion 2, the supporter 1, the lamp clamping portion 2, and the snap-fit structure 4. Preferably, the two snap-fit structures 4 and the two lamp clamping portions 2 are provided symmetrically at the two sides of the supporter 1.

The supporter 1 and the fixed base 3 are integrally molded or detachably fixed on the fixed base 3.

The lamp supporting member 2 and the fixed base 3 are integrally molded or detachably fixed on the fixed base 3.

The snap-fit structure 4 and the fixed base 3 are integrally molded or detachably fixed on the fixed base 3.

The detachably fixed connection may be carried out by adhesion with adhesive tapes, screw fixing and snap-fit components, etc.

This embodiment of the present invention is preferable that, the supporter 1, the lamp clamping portion 2 and the snap-fit structure 4 are all integrally molded with the fixed base 3.

Figure 8:
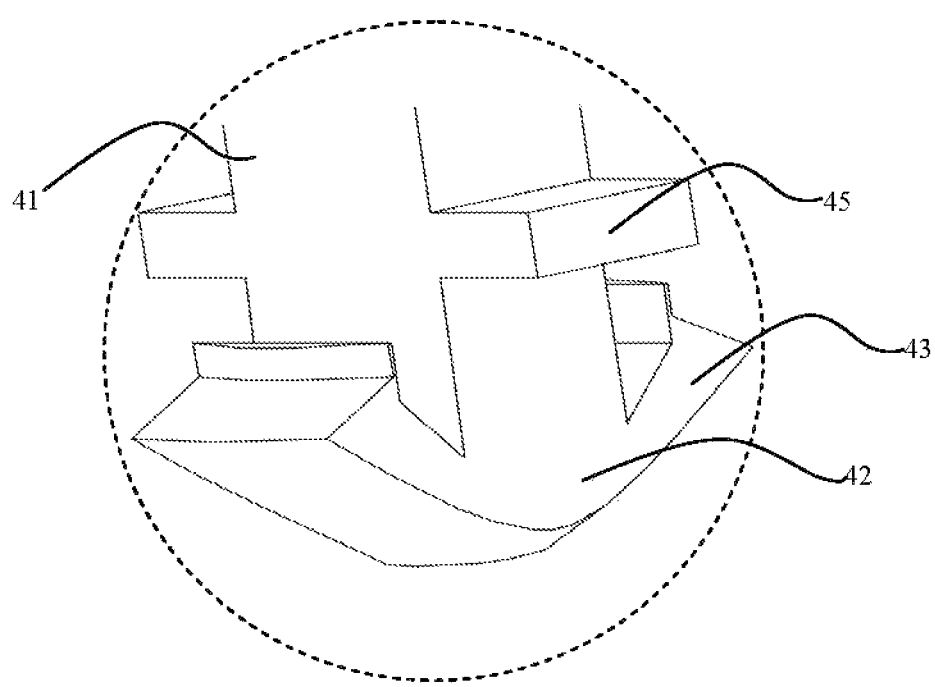
FIG. 8 is a partial enlarged view of the structure I shown in FIG. 2 and the structure II shown in FIG. 5.

As shown in FIG. 2 and FIG. 8, the snap-fit structure 4 according to an embodiment of the present invention may comprise: a snap-fit cylinder 41 with one end thereof being connected to the fixed base 3; a snap-fit base 42 provided at the other end of the snap-fit cylinder 41; and at least one fin 43 extending from the snap-fit base 42 along a direction away from the snap-fit cylinder 41 and toward the fixed base 3. The snap-fit structure may further comprise: a snap-fit protrusion 45 provided on at least one lateral face of the snap-fit cylinder 41. More specifically, the snap-fit structure 4 described in this embodiment of the present invention may comprise: the snap-fit cylinder 41, the snap-fit base 42, the snap-fit protrusion 45, and the fin 43; one end of the snap-fit cylinder 41 is connected with the fixed base 3, and the other end of the snap-fit cylinder 41 is connected with the snap-fit base 42; one end of the fin 43 is connected with the snap-fit base 42, and the other end of the fin 43 extends in a direction away from the snap-fit base 42 and close to the fixed base 3. The extending end of the fin 43 may have a protrusion, and the snap-fit protrusion 45 may be located on at least one lateral face of the snap-fit cylinder 41.

Specifically, the snap-fit cylinder 41 may be a cuboid or a cube, and in this embodiment, it is preferably a cuboid. The snap-fit cylinder 41 has four lateral faces; the number of the fins 43 is preferably two, and the number of the snap-fit protrusions 45 is preferably two, moreover, the two fins 43 are located on opposite two lateral faces of the snap-fit cylinder 41, and the two snap-fit protrusions 45 are located on other two lateral faces of the snap-fit cylinder 41.

Of course, the number of the snap-fit protrusions 45 may be one, three or four, and the number of the fins 43 also may be one, three or four. The position of the snap-fit protrusion 45 located on the snap-fit cylinder 41 should not be too close to the fin 43, and specifically, the position is above an intermediate portion at a lateral side of the snap-fit cylinder 41. The snap-fit protrusion 45, the fin 43 and the snap-fit cylinder 41 are integrally molded.

Further, the snap-fit structure 4 further comprises a snap-fit resilient structure. When the snap-fit structure 4 and a back cover are snap-fitted, the snap-fit resilient structure is elastically deformed, to exert an elastic retaining force on the back cover in a direction away from the fixed base.

The snap-fit resilient structure, with the action of its elastic force, ensures the accuracy of the distance between the lower surface of the lamp clamping portion 2 (the lower surface of the back cover after snap-fit) and the upper surface of the snap-fit structure 4. This can, on one hand, ensure full snap-fit of the snap-fit structure 4 with a back cover 7, that is, ensure high strength and no looseness after snap-fit; and can, on the other hand, ensure that the fins 43 of the snap-fit structure 4 can be fully opened, thereby solving the problem of unstable positioning of the backlight source due to unstable snap-fit of the snap-fit structure 4 and the further problem of affecting the light-emitting uniformity of the backlight module.

In this embodiment, the snap-fit resilient structure is an oblique-L-shaped structure 44. The oblique-L-shaped structure 44 extends from the lower surface of the fixed base 3.

Further, one end of the snap-fit resilient structure is located on the lower surface of the fixed base 3 and on a lateral face of one end of the snap-fit cylinder 41 connecting with the fixed base 3; the snap-fit resilient structure extends, in a direction away from the fixed base 3, into an oblique-L-shaped structure 44. For example, one end of the oblique-L-shaped structure 44 connecting with the fixed base 3 may be located on a lateral face of one end of the snap-fit cylinder 41 connecting with the fixed base 3, and, the other end of the oblique-L-shaped structure 44 extends in a direction away from the fixed base 3 and away from the snap-fit cylinder 41.

Further, the section of the fixed base 3 connecting with the snap-fit structure 4 is in a different plane from the plane of the section of the fixed base 3 where the lamp clamping portion 2 and the supporter 1 locate.

Preferably, the plane of the section of the fixed base 3 connecting with the snap-fit structure 4, is higher than the plane of the section of the fixed base 3 where the lamp clamping portion 2 and the supporter 1 locate. In other words, the section of the fixed base 3 where the snap-fit structure is provided is offset toward the first side, with respect to the section of the fixed base 3 where the lamp clamping portion 2 is provided. In this embodiment, the supporter 1 is provided in the section of the fixed base 3 where the lamp clamping portion 2 is provided.

More preferably, the inclined plane, which is formed by connecting the two planes, i.e., the plane of the section of the fixed base 3 connecting with the snap-fit structure 4, and the plane of the section of the fixed base 3 where the lamp clamping portion 2 and the supporter 1 locate, forms an included angle of 20-45 degrees with a horizontal plane.

The oblique-L-shaped structure 44 has at least one provided on the four lateral faces of the snap-fit cylinder 41 connecting with the fixed base 3. In the figure, the number of the oblique-L-shaped structure 44 is shown as one, and the oblique-L-shaped structure 44 is provided on a left lateral face of the snap-fit cylinder 41 connecting with the fixed base 3; however, the present invention is not limited in this regard.

Figure 4:
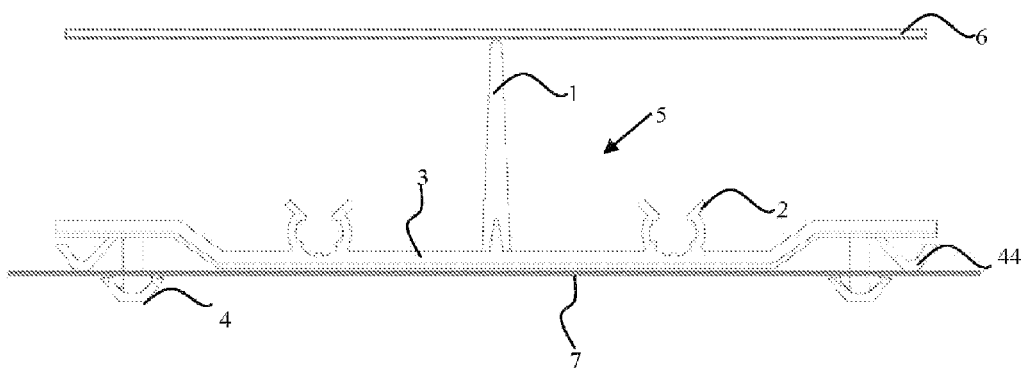
FIG. 4 is a schematic structural diagram of a backlight module according to an embodiment of the present invention.

FIG. 4 is a schematic structural diagram of a backlight module according to an embodiment of the present invention. The backlight module comprises: the above-described backlight lamp guide 5; one end of the supporter 1 of the backlight lamp guide 5 is connected with the upper surface of the fixed base 3, and the other end is in contact with optical films 6, for supporting the optical films 6. With the use of the snap-fit resilient structure 44 in the snap-fit structure 4 provided by the embodiment of the present invention, when the snap-fit structure 4 passes through a hole on the back cover 7, and under the action of a snap-fit force, the snap-fit resilient structure 44 increases the distance between the lower surface of the back cover 7 and the fin 43, to ensure full snap-fit of the snap-fit structure 4, and to fully open the fin 43; after completion of snap-fit, with the removal of the snap-fit force, under the action of a resilient force generated by the snap-fit resilient structure 44, the distance between the lower surface of the back cover 7 and the fin 43 is reduced, so that the fully opened fin 43 can tightly abut against the lower surface of the back cover 7, thereby ensuring the snap-fit strength of the snap-fit structure 4. The fin 43 of the snap-fit structure 4 retracts while passing through the hole and expands after passing through the hole, thereby clamping the backlight lamp guide 5 on the back cover 7, so as to position the backlight lamp guide 5 with respect to the back cover. The snap-fit resilient structure 44 of the snap-fit structure 4, under the action of a resilient force, causes the snap-fit structure 4 to more tightly abut against the back cover 7, thereby ensuring the stability of the snap-fit of the snap-fit structure 4 with the back cover 7. More preferably, in order to prevent the snap-fit force from being too large and beyond the resilient limit of the snap-fit resilient structure 44 and thus causing break-up of the snap-fit resilient structure 44, the section of the fixed base 3 connecting with the snap-fit structure 4 is in a different plane from the plane of the section of the fixed base 3 where the lamp clamping portion 2 and the supporter 1 locate, and such structure prevents break-up of the resilient structure 44 caused by a too large snap-fit force. The snap-fit protrusion 45 after snap-fit is located on the upper surface of the back cover 7, and this can ensure more stable snap-fit of the snap-fit structure 4 with the back cover 7; the protrusion at the extending end of the fin 43 is preferably perpendicular to a horizontal plane, thus the fin 43 after being opened can be more securely fixed on the lower surface of the back cover 7.

Figure 5:
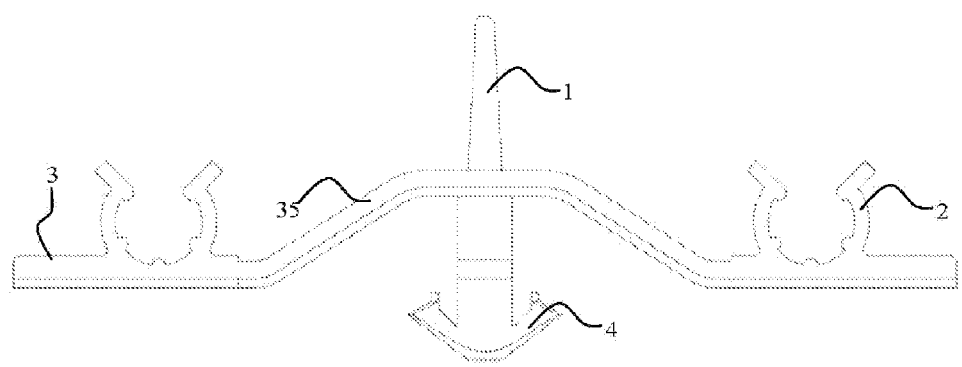
FIG. 5 is a front view of another backlight lamp guide according to an embodiment of the present invention.
Figure 6:
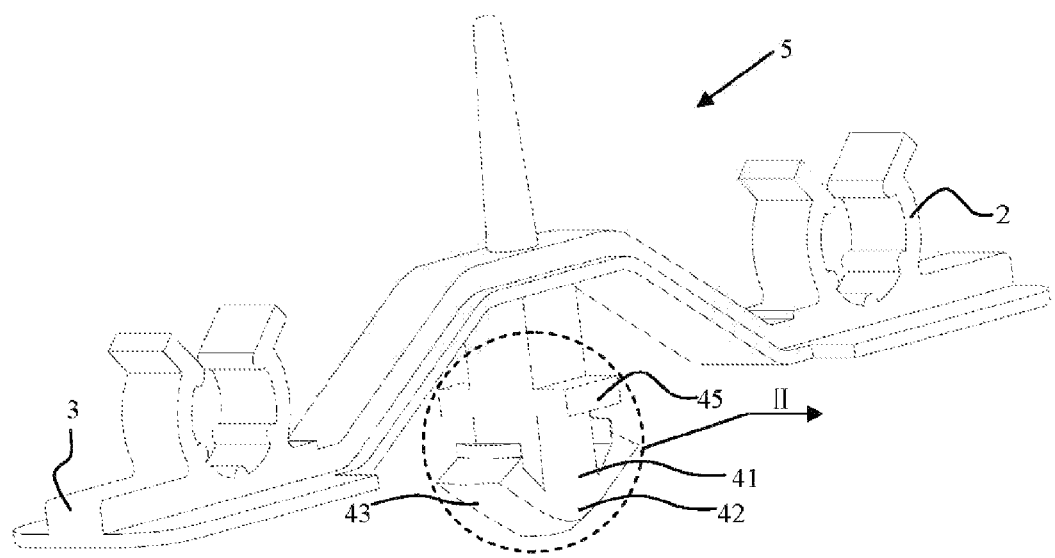
FIG. 6 is a perspective view of another backlight lamp guide according to an embodiment of the present invention.

FIG. 5 is a front view of a backlight lamp guide 5 for a backlight module, according to another embodiment of the present invention; and FIG. 6 is a perspective view of the backlight lamp guide 5. In the figure of the embodiment of the present invention, the number of the supporter 1 of the backlight lamp guide 5 is one, and the number of the lamp clamping portions 2 is two; the lamp clamping portions 2 are located on the upper surface of the supporter 1, and the lamp clamping portions 2 are located at two sides of the supporter 1, preferably symmetrically provided; the number of the snap-fit structure 4 is one, and the snap-fit structure 4 is located on the lower surface of the supporter 1. As shown in the figures, the snap-fit structure 4 and the supporter 4 are correspondingly provided on the lower surface of the fixed base 3.

The supporter 1 and the fixed base 3 are integrally molded or detachably fixed on the fixed base 3.

The lamp supporting member 2 and the fixed base 3 are integrally molded or detachably fixed on the fixed base 3.

The snap-fit structure 4 and the fixed base 3 are integrally molded or detachably fixed on the fixed base 3.

The detachably fixed connection may be carried out by adhesion with adhesive tapes, screw fixing and snap-fit components, etc.

This embodiment of the present invention is preferable that, the supporter 1, the lamp clamping portion 2 and the snap-fit structure 4 are all integrally molded with the fixed base 3.

As shown in FIG. 5 and FIG. 8, in this embodiment of the present invention, the snap-fit structure 4 may comprise: a snap-fit cylinder 41, a snap-fit base 42, a snap-fit protrusion 45, and a fin 43; one end of the snap-fit cylinder 41 is connected with the fixed base 3, and the other end of the snap-fit cylinder 41 is connected with the snap-fit base 42; one end of the fin 43 is connected with the snap-fit base 42, and the other end of the fin 43 extends in a direction away from the snap-fit base 42 and close to the fixed base 3; the extending end of the fin 43 may have a protrusion, and the snap-fit protrusion 45 may be located on at least one lateral face of the snap-fit cylinder 41.

Specifically, the snap-fit cylinder 41 may be a cuboid or a cube, and in this embodiment, it is preferably a cuboid. The snap-fit cylinder 41 has four lateral faces; the number of the fins 43 is preferably two, and the number of the snap-fit protrusions 45 is preferably two, moreover, the two fins 43 are located on opposite two lateral faces of the snap-fit cylinder 41, and the two snap-fit protrusions 45 are located on other two lateral faces of the snap-fit cylinder 41.

Of course, the number of the snap-fit protrusions 45 may be one, three, four, and the number of the fins 43 also may be one, three, or four. The position of the snap-fit protrusion 45 located on the snap-fit cylinder 41 should not be too close to the fin 43, and specifically, the position is above an intermediate portion at a lateral side of the snap-fit cylinder 41. The snap-fit protrusion 45, the fin 43 and the snap-fit cylinder 41 are integrally molded.

Further, the snap-fit structure 4 further comprises a snap-fit resilient structure. When the snap-fit structure 4 and a back cover are snap-fitted, the snap-fit resilient structure is elastically deformed, to exert an elastic retaining force on the back cover in a direction away from the fixed base.

In this embodiment, the section of the fixed base 3 where the snap-fit structure is provided is offset toward the first side, with respect to the section of the fixed base 3 where the lamp clamping portion 2 is provided, and, the snap-fit resilient structure is configured as an arcuate portion 35 of the fixed base, which is connected between the section of the fixed base where the snap-fit structure is provided and section of the fixed base where the lamp clamping portion is provided. The snap-fit resilient structure, with the action of its elastic force, ensures the accuracy of the distance between the lower surface of the lamp clamping portion 2 (the lower surface of the back cover after snap-fit) and the upper surface of the snap-fit structure 4, and this can not only ensure full snap-fit of the snap-fit structure 4 with a back cover 7, that is, ensure high strength and no looseness after snap-fit; but also can ensure that the fins 43 of the snap-fit structure 4 can be fully opened, thereby solving the problem of unstable positioning of the backlight source due to unstable snap-fit of the snap-fit structure 4 and the further problem of affecting the light-emitting uniformity of the backlight module.

Further, the section of the snap-fit base 3 where the supporter 1 and the snap-fit structure 4 are located, is in a different plane from the plane of the section of the snap-fit base 3 where the lamp clamping portion 2 locates.

Further, the section of the snap-fit base 3 where the supporter 1 and the snap-fit structure 4 are located, is higher than the plane of the section of the snap-fit base 3 where the lamp clamping portion 2 locates; the section of the snap-fit base 3 where the supporter 1 and the snap-fit structure 4 locate, forms an arcuate structure 35. Preferably, the arcuate structure 35 is a resilient structure.

Furthermore, the snap-fit structure 4 and the supporter 1 are correspondingly provided on the lower surface of the fixed base 3, and more specifically, the snap-fit structure 4 is provided on the lower surface of the arcuate structure 35, and provided corresponding to the supporter 1 on the upper surface of arcuate structure 25.

Figure 7:
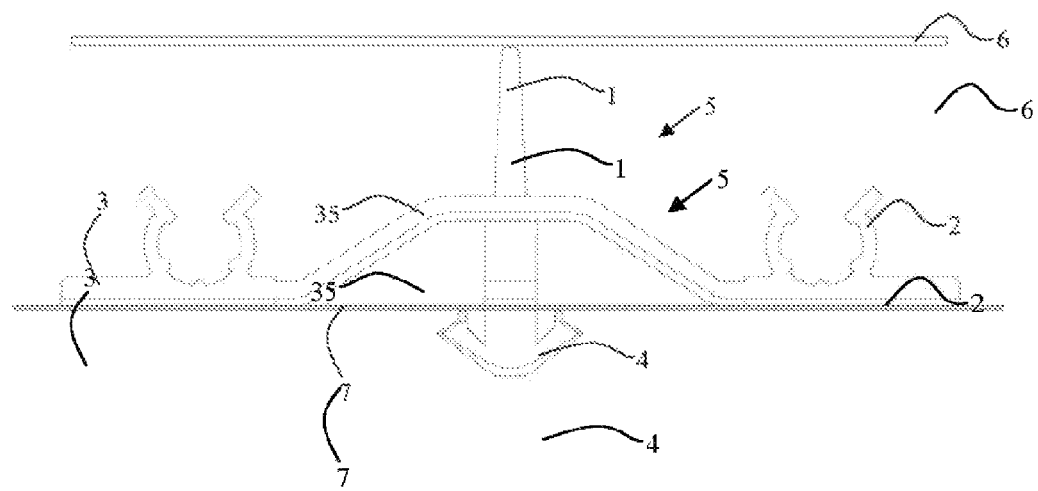
FIG. 7 is a schematic structural diagram of another backlight module according to an embodiment of the present invention.

FIG. 7 is a schematic structural diagram of a backlight module according to an embodiment of the present invention. One end of the supporter 1 of the backlight lamp guide 5 of the backlight module is connected with the upper surface of the arcuate structure 35, and the other end is in contact with optical films 6, for supporting the optical films 6. The snap-fit structure 4 passes through a hole on the back cover 7, and under the action of a snap-fit force, the arcuate structure 35 increases the distance between the lower surface of the back cover 7 and the fin 43, to ensure full snap-fit of the snap-fit structure 4, and to fully open the fin 43; after completion of snap-fit, with the removal of the snap-fit force, the backlight lamp guide 5 will, under the action of a resilient force generated by the arcuate structure 35, reduce the distance between the lower surface of the back cover 7 and the fin 43, so that the fully opened fin 43 can tightly abut against the lower surface of the back cover 7, thereby ensuring the snap-fit strength of the snap-fit structure 4. The fin 43 of the snap-fit structure 4 retracts while passing through the hole and expands after passing through the hole, thereby clamping the backlight lamp guide 5 on the back cover 7, so as to position the backlight lamp guide 5 with respect to the back cover 7. The snap-fit protrusion 45 enhances the stability and security of the fixing of the backlight lamp guide 5 and the back cover 7. The arcuate structure 35, under the action of a resilient force, causes the snap-fit structure 4 to more tightly abut against the back cover 7, thereby ensuring the stability of the snap-fit of the snap-fit structure 4 with the back cover 7; the protrusion at the extending end of the fin 43 is preferably perpendicular to a horizontal plane, thus the fin 43 after being opened can be more securely fixed on the lower surface of the back cover 7.

The embodiment of the present invention provides a backlight lamp guide, and the backlight lamp guide comprises: a base, a lamp clamping portion, a supporter, a snap-fit structure; the snap-fit structure of the backlight lamp guide further comprises a snap-fit resilient structure, which can solve the light-emitting non-uniformity phenomenon due to unstable snap-fit of a snap-fit structure in an existing backlight lamp guide.

The above is merely specific implementation of the present invention, and the scope of the present invention is not limited thereto. Within the technical scope disclosed by the invention, modifications or alterations that can be easily devised by those skilled who are familiar with the art, should all be included within the scope of the present invention. Accordingly, the scope of the invention should be defined by the scope of the claims of the present invention.

What is claimed is:

1. A backlight lamp guide for a backlight module, comprising:
    a fixed base;
    a lamp clamping portion, provided on a first side of the fixed base; and
    a snap-fit structure, provided on a second side of the fixed base opposite to the first side,
    wherein, the snap-fit structure comprises a snap-fit resilient structure; when the snap-fit structure and a back cover are snap-fitted, the snap-fit resilient structure is elastically deformed, to exert an elastic retaining force on the back cover in a direction away from the fixed base;
    the snap-fit resilient structure is an oblique-L-shaped structure extending from the second side of the fixed base; and
    the section of the fixed base where the snap-fit structure is provided is offset toward the first side, with respect to the section of the fixed base where the lamp clamping portion is provided.

2. The backlight lamp guide according to claim 1, wherein, the snap-fit structure further comprises: a snap-fit cylinder with one end thereof being connected to the fixed base; a snap-fit base provided at the other end of the snap-fit cylinder; and at least one fin extending from the snap-fit base along a direction away from the snap-fit cylinder and toward the fixed base.

3. The backlight lamp guide according to claim 2, wherein, the snap-fit structure further comprises: a snap-fit protrusion provided on at least one lateral face of the snap-fit cylinder.

4. The backlight lamp guide according to claim 1, wherein, one end of the oblique-L-shaped structure connecting with the fixed base is located at a lateral face of one end of the snap-fit cylinder connecting with the fixed base, and, the other end of the oblique-L-shaped structure extends along a direction away from the fixed base and away from the snap-fit cylinder.

5. The backlight lamp guide according to claim 1, further comprising: a supporter provided on the first side of the fixed base, and the supporter is provided in said section of the fixed base where the lamp clamping portion is provided.

6. The backlight lamp guide according to claim 5, wherein, the backlight lamp guide has one said lamp clamping portion provided at each of the two sides of the supporter.

7. A backlight lamp guide for a backlight module comprising:
    a fixed base;
    a lamp clamping portion, provided on a first side of the fixed base; and
    a snap-fit structure provided on a second side of the fixed base opposite to the first side;
    wherein the snap-fit structure comprises a snap-fit resilient structure; when the snap-fit structure and a back cover are snap-fitted, the snap-fit resilient structure is elastically deformed, to exert an elastic retaining force on the back cover in a direction away from the fixed base;
    wherein the section of the fixed base where the snap-fit structure is provided is offset toward the first side, with respect to the section of the fixed base where the lamp clamping portion is provided, and, the snap-fit resilient structure is configured as an arcuate portion of the fixed base, which is connected between the section of the fixed base where the snap-fit structure is provided and section of the fixed base where the lamp clamping portion is provided.

8. The backlight lamp guide according to claim 7, further comprising: a supporter provided, corresponding to the snap-fit structure, on the first side of the fixed base.

9. The backlight lamp guide according to claim 8, wherein the backlight lamp guide has one said lamp clamping portion provided at each of the two sides of the supporter.

10. The backlight lamp guide according to claim 3, wherein two snap-fit protrusions are provided on two opposite lateral faces of the snap-fit cylinder.

11. The backlight lamp guide according to claim 10, wherein two fins are provided for the snap-fit structure, and the two fins are located respectively on two lateral faces of the snap-fit cylinder other than the lateral faces where the two snap-fit protrusions are provided.

12. A backlight module, comprising:
    a back cover;
    a lamp; and
    a backlight lamp guide, comprising: a fixed base; a lamp clamping portion, provided on a first side of the fixed base; and a snap-fit structure, provided on a second side of the fixed base opposite to the first side, for fixing to the back cover,
    wherein, the snap-fit structure of the backlight lamp guide comprises a snap-fit resilient structure; when the snap-fit structure and the back cover are snap-fitted, the snap-fit resilient structure is elastically deformed, to exert an elastic retaining force on the back cover in a direction away from the fixed base;
    the section of the fixed base where the snap-fit structure is provided is offset toward the first side, with respect to the section of the fixed base where the lamp clamping portion is provided, and, the snap-fit resilient structure is configured as an arcuate portion of the fixed base, which is connected between the section of the fixed base where the snap-fit structure is provided and section of the fixed base where the lamp clamping portion is provided.

13. The backlight module according to claim 12, wherein the backlight lamp guide further comprises: a supporter provided, corresponding to the snap-fit structure, on the first side of the fixed base.

14. The backlight module according to claim 13, the backlight lamp guide has one said lamp clamping portion provided at each of the two sides of the supporter.

15. A backlight module, comprising:
    a back cover;
    a lamp; and
    a backlight lamp guide, comprising: a fixed base; a lamp clamping portion, provided on a first side of the fixed base; and a snap-fit structure, provided on a second side of the fixed base opposite to the first side, for fixing to the back cover,
    wherein, the snap-fit structure of the backlight lamp guide comprises a snap-fit resilient structure; when the snap-fit structure and the back cover are snap-fitted, the snap-fit resilient structure is elastically deformed, to exert an elastic retaining force on the back cover in a direction away from the fixed base; and
    the section of the fixed base where the snap-fit structure is provided is offset toward the first side, with respect to the section of the fixed base where the lamp clamping portion is provided, and, the snap-fit resilient structure is configured as an arcuate portion of the fixed base, which is connected between the section of the fixed base where the snap-fit structure is provided and section of the fixed base where the lamp clamping portion is provided.

16. The backlight module according to claim 15, wherein the snap-fit structure further comprises: a snap-fit cylinder with one end thereof being connected to the fixed base; a snap-fit base provided at the other end of the snap-fit cylinder; and at least one fin extending from the snap-fit base along a direction away from the snap-fit cylinder and toward the fixed base.

17. The backlight module according to claim 16, wherein the snap-fit structure further comprises: a snap-fit protrusion provided on at least one lateral face of the snap-fit cylinder.

18. The backlight module according to claim 15, wherein one end of the oblique-L-shaped structure connecting with the fixed base is located at a lateral face of one end of the snap-fit cylinder connecting with the fixed base, and, the other end of the oblique-L-shaped structure extends along a direction away from the fixed base and away from the snap-fit cylinder.

19. The backlight module according to claim 15, wherein the backlight lamp guide further comprises: a supporter provided on the first &de of the fixed base, and the supporter is provided in said section of the fixed base where the lamp clamping portion is provided.

20. The backlight module according to claim 19, wherein the backlight lamp guide has one said lamp clamping portion provided at each of the two sides of the supporter.

* * * * *